US012753800B2

(12) United States Patent
Rocha et al.

(10) Patent No.: US 12,753,800 B2
(45) Date of Patent: Oct. 6, 2026

(54) ROLLING BEARING FASTENING RING FOR ROTATING ELECTRIC MACHINES AND ROTATING ELECTRIC MACHINE

(71) Applicant: WEG Equipamentos Elétricos S.A, Jaraguá do Sul (BR)

(72) Inventors: Jonatas Fraga Rocha, Jaraguá do Sul (BR); Vando Vanderlei Adami, Jaraguá do Sul (BR)

(73) Assignee: WEG Equipamentos Elétricos S.A, Jaraguá do Sul (BR)

( * ) Notice: Subject to any disclaimer, the term of this patent is extended or adjusted under 35 U.S.C. 154(b) by 65 days.

(21) Appl. No.: 18/523,136

(22) Filed: Nov. 29, 2023

(65) Prior Publication Data

US 2025/0129818 A1 Apr. 24, 2025

(30) Foreign Application Priority Data

Oct. 18, 2023 (BR) ........................ 102023021651-0

(51) Int. Cl.
*F16C 33/66* (2006.01)

(52) U.S. Cl.
CPC ...... *F16C 33/6659* (2013.01); *F16C 2380/26* (2013.01)

(58) Field of Classification Search
CPC .... F16C 33/66; F16C 33/6659; F16C 35/067; F16C 2380/26; H02K 15/144
See application file for complete search history.

(56) References Cited

U.S. PATENT DOCUMENTS 7,594,757 B2 * 9/2009 Verhaegen ............... H02K 9/19
384/313

FOREIGN PATENT DOCUMENTS

CH 589809 A5 * 7/1977 .............. B41F 13/20

* cited by examiner

*Primary Examiner* — James Pilkington
(74) *Attorney, Agent, or Firm* — SALIWANCHIK, LLOYD & EISENSCHENK

(57) ABSTRACT

The present invention relates to a rolling bearing fastening ring for rotating electric machines, which comprises an intermediate lubrication chamber and a rolling bearing lubrication chamber, wherein both chambers are fluidly separated and independent of each other. The present invention further relates to a rotating electric machine.

4 Claims, 4 Drawing Sheets

AA Section

AA Section

ROLLING BEARING FASTENING RING FOR ROTATING ELECTRIC MACHINES AND ROTATING ELECTRIC MACHINE

CROSS-REFERENCE TO A RELATED APPLICATION

This application claims priority to Brazilian Patent Application No. BR102023021651-0, filed on Oct. 18, 2023; which is incorporated in its entirety herein.

FIELD OF INVENTION

The present invention pertains to the field of rotating electric machines, in particular bearings for rolling bearings, notably the sealing and lubrication of bearings for rolling bearings of rotating electric machines.

BACKGROUND OF THE INVENTION

Rotating electric machines are equipment used for transforming electric energy into mechanical energy, in the case of motors, and for transforming mechanical energy into electric energy, in the case of generators. They consist of essentially four basic structures, which are the housing, stator, rotor, and bearings/caps.

The housing is a static element responsible for integrating the structures of the rotating electric machine.

The stator is the static active (energized) component responsible for transmitting the magnetic flux for rotating the rotor, in the case of motors, and for transmitting the energy generated by the rotor, in the case of generators, whereas the rotor is the active (energized) component of the rotating electric machine.

The rotor, in turn, is basically composed of a shaft onto which one or more cages, coils, or permanent magnets are arranged, depending on the construction type and operating principle of the rotating electric machine.

The bearings are the elements responsible for coupling the rotating parts to the static parts of a rotating electric machine, performing, for example, the coupling, bearing, and centralization of the (rotating) rotor in relation to the (static) stator, allowing for relative movement between rotor and stator, as well as transmitting forces therebetween.

It should be noted that, in the context of the present invention, the term bearings refers specially to bearings equipped with rolling elements, commonly called bearings for greased rolling bearings, wherein the rolling bearings are arranged in cavities of the motor housing and/or caps and wrapped and internally sealed by rolling bearing fastening rings. Grease is introduced under pressure into the motor cap in a first chamber formed between the cap and the rolling bearing, then passing through the rolling bearing and entering into a second chamber formed inside the rolling bearing fastening ring, wherein the grease typically accumulates in the rolling bearing's vicinity, wherein the closing structure comprises a cap and, optionally, a rolling bearing fastening ring.

Give that rotating electric machines operate under a myriad of conditions of rotation, mechanical load, temperature, and environments, the bearings must be sealed so as to prevent water and dust from entering it, meeting the most demanding protection classes, at the same time as both rolling bearings and grease chambers are adequately lubricated by means of uniform grease distribution to ensure adequate lubrication and sufficient thermal exchange and prevent bearing overheating, which can promote lubricant degradation and damage the bearing as a whole.

Therefore, the challenge lies in designing bearings for rolling bearings provided with rolling bearing fastening rings which allow for a sealing of the bearings and ensure an even distribution of grease load, so as to prevent the accumulation of grease close to the rolling bearings and which are, at the same time, simple to construct and manufacture, optimizing both the use of raw materials and the manufacturing and assembly process.

STATE OF THE ART

In the state of the art there are several solutions aimed at sealing and optimizing the lubrication of bearings for greased rolling bearings of rotating electric machines.

One such example is patent document CN210490608 which discloses and describes a dynamic seal structure of a rotating electrical machine, wherein the upper part of the motor base is fixedly connected with a motor through a connecting block, the outside of the motor is fixedly connected with cooling fins. Heat dissipation holes are evenly formed on the heat dissipation fins; the motor left end is fixedly connected with a fan protective cap; the motor right end is rotatably connected to a rotating shaft through a bearing; a keyway slot is formed on the rotating shaft; the motor right end is fixedly connected with an motor end cap; the left side of the motor end cap is fixedly connected with a shaft cap; concave structures are symmetrically formed on one side, close to the rotating shaft, of the motor cap; a rubber oil seal is arranged in the concave structure; and two rubber oil seals are arranged in the shaft hole of the end cap.

The solution suggested by CN210490608 provides seals which are located directly in pockets formed in the motor closing cap. Therefore, this solution does not disclose or describe an element which can be understood as a rolling bearing fastening ring which allows for relubrication of the rolling bearings and the grease chamber by grease fittings built directly into the ring, or which has a chamber that prevents water or dust from passing into the motor.

As can be inferred from the description above, there is space and demand for a solution for rolling bearings fastening rings, in particular rolling bearing fastening rings which make sealing the bearings possible without the need for additional caps and which ensure uniform grease load distribution to rolling bearings and which are, at the same time, simple in construction and manufacturing, with optimization for both the use of raw materials and the manufacturing and assembly process in relation to their peers in the relevant state of the art.

OBJECTS OF THE INVENTION

Therefore, one of the objectives of the present invention is providing a rolling bearing fastening ring for rotating electric machines.

Another object of the present invention is to provide a rotating electric machine.

Additional features and details thereof are provided to meet the objectives of the present invention.

BRIEF DESCRIPTION OF THE FIGURES

For a better understanding and visualization of the object to which the invention relates, it will now be described with reference to the accompanying figures, representing the obtained technical effect by means of an exemplary embodiment without limiting the scope of the present invention, in which, schematically.

DETAILED DESCRIPTION OF THE INVENTION

Figure 1:
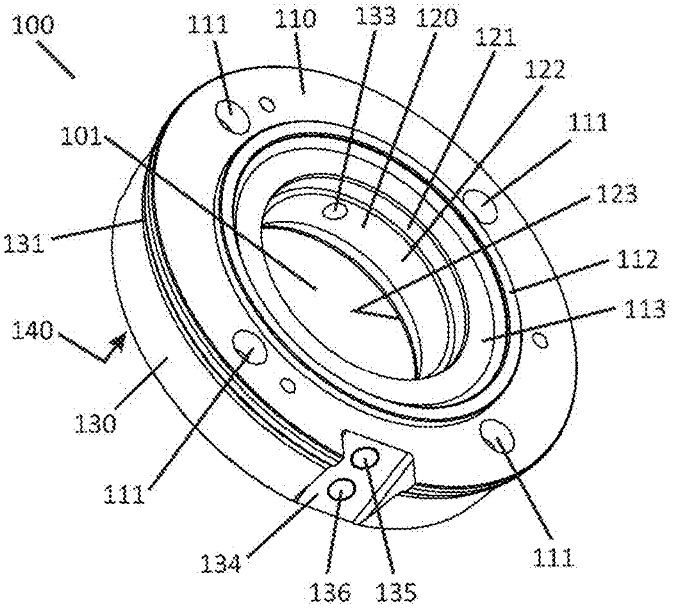
FIG. 1 shows a perspective view of a rolling bearing fastening ring for a rotating electric machine according to the invention.
Figure 2:
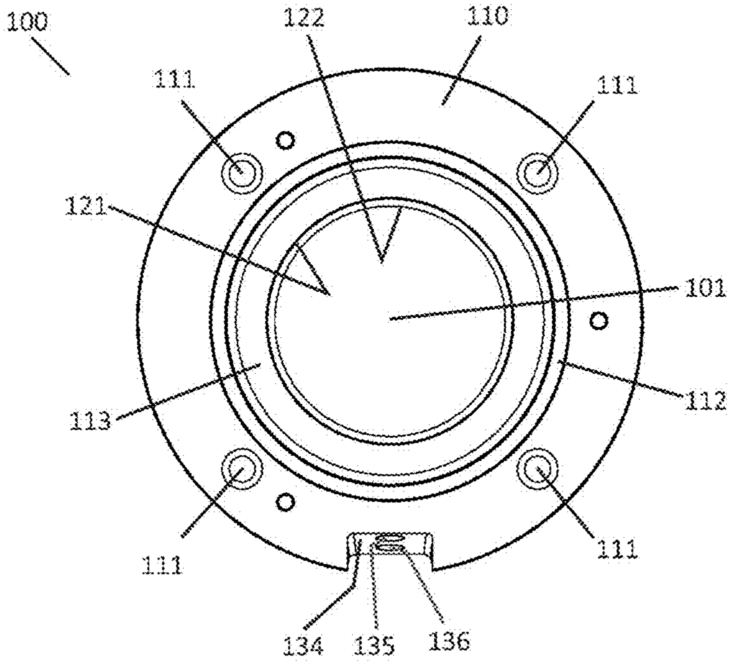
FIG. 2 shows an anterior view of the rolling bearing fastening ring of FIG. 1.
Figure 3:
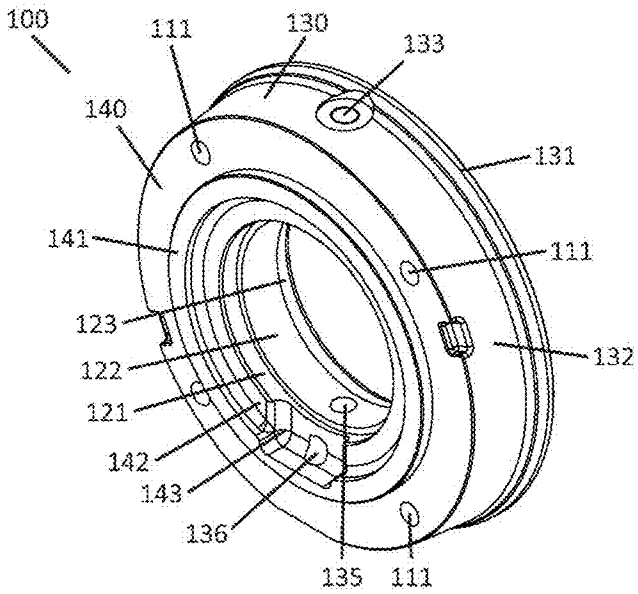
FIG. 3 shows a perspective view of the rolling bearing fastening ring of FIG. 1.
Figure 4:
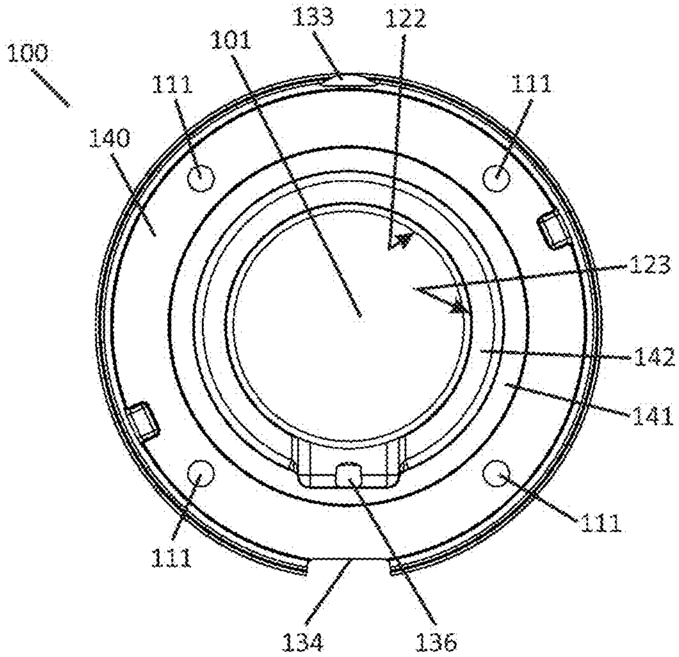
FIG. 4 shows a posterior view of the rolling bearing fastening ring of FIG. 1.
Figure 5:
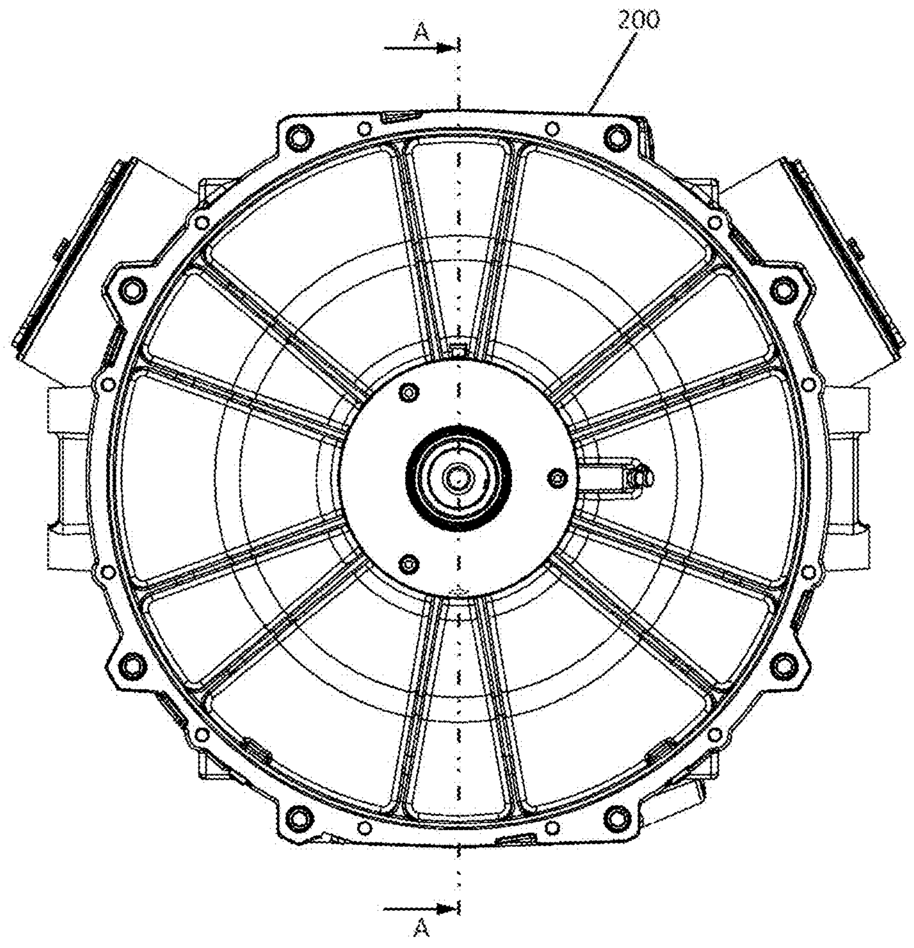
FIG. 5 shows a front view of a rotating electric machine comprising a rolling bearing fastening ring with a A-A section.
Figure 6:
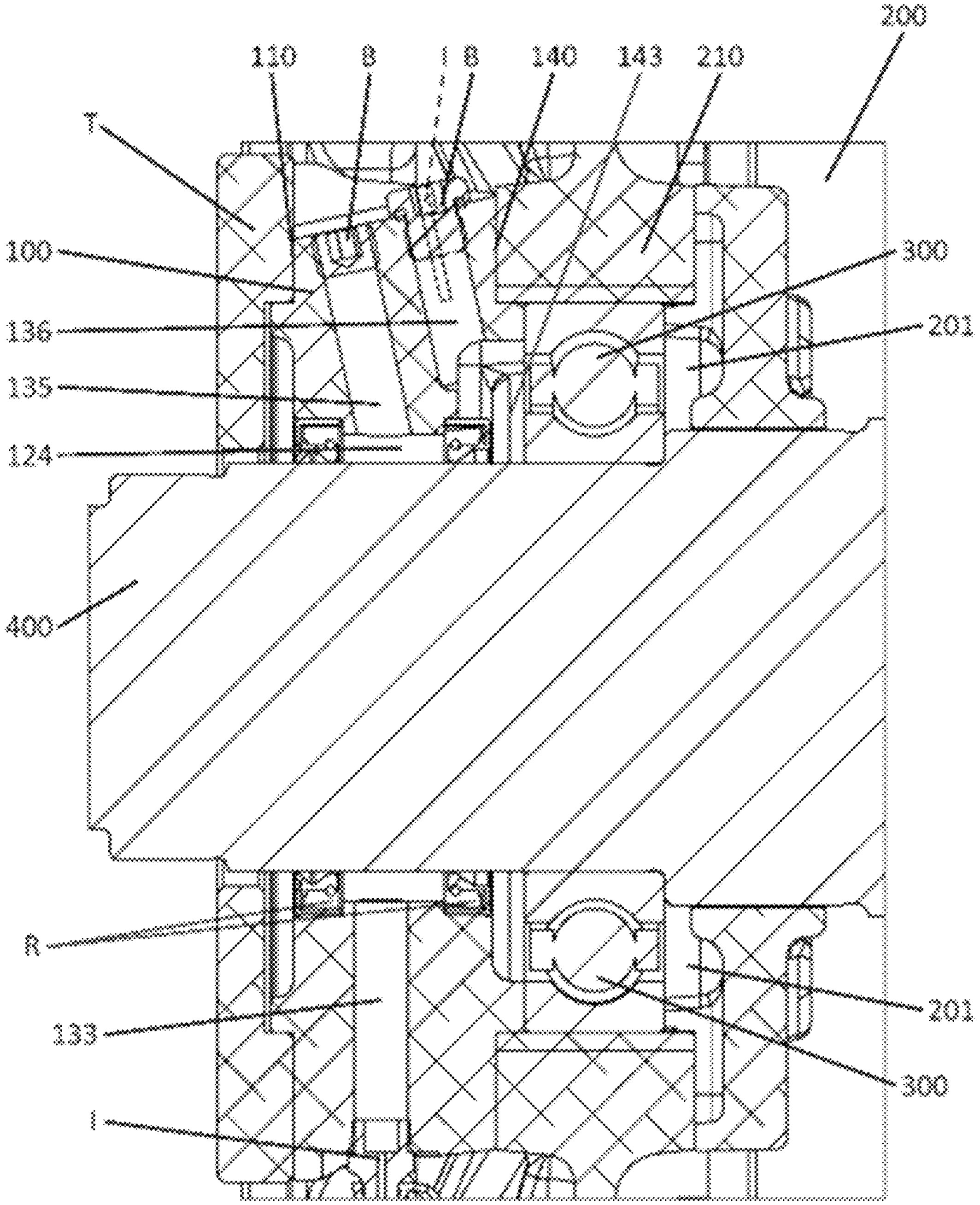
FIG. 6 shows an enlarged side view of the A-A section of the rotating electric machine in FIG. 5.

The present invention relates to a rolling bearing fastening ring (100) for application in rotating electric machines (200) provided with bearings for rolling bearings, wherein the rotating electric machine (200) comprises at least one rolling bearing (300) housed in a cap (210) of the rotating electric machine (200) and bearing a rotor shaft (400), the rolling bearing (300) being axially fixed and held in position by the rolling bearing fastening ring (100).

In the context of the present invention, the term "housing" refers, broadly, to the static structural components of a rotating electric machine (200), and May also, but without limiting the invention, include caps, rolling bearing rings and other related elements.

In a preferred embodiment of the invention, the rolling bearing fastening ring (100) is an annular body formed in a single piece, comprising a central annular opening (101) which is also concentric with the annular body, an anterior region (110), an internal perimeter region (120), an external perimeter region (130), and a posterior region (140).

The anterior region (110) is the region opposite the rolling bearing (300), comprising a face provided with through-holes (111) which allow the passage of fixing elements (not shown) for fixing the rolling bearing fastening ring (100) to the cap (210) of the rotating electric machine (200). It should be noted that the rolling bearing fastening ring (100) of the invention does not require the use of additional caps or seals, however, it may optionally comprise one or more elevated annular sections (112) and/or one or more recessed annular sections (113) for centering and aligning any additional caps (T) or seals. Therefore, the rolling bearing fastening ring (100) may optionally additionally comprise a cap (T), which acts as an external element fixed to the rolling bearing fastening ring (100).

The internal perimeter region (120) delimits the central annular opening (101), comprising first annular seat (121), a central flat annular surface (122), and a second annular seat (123), wherein the diameters of the first and second annular seats (121, 123) are preferably equal to or greater than the diameter of the central flat annular surface (122). It should be noted that the internal perimeter region (120) of the rolling bearing fastening ring (100) of the present invention has a geometry which allows machining for different seals, in order to meet different degrees of protection, e.g., IPX7, IP6K9K. It is also possible to subject the internal perimeter region (120) to other machining processes, in order to assemble different sealing elements (R) to meet different degrees of protection, e.g., IP68, IP66.

The external perimeter region (130) comprises a preferably elevated perimeter portion (131), adjacent to the flat face of the anterior region (110), and a preferably recessed perimeter portion (132), wherein the perimeter portion (132) comprises at least one first lubricant inlet through-perforation (133), preferably perpendicular to the rotor shaft (400) and which fluidly connects the external perimeter region (130) to the internal perimeter region (120) and, in a position preferably diametrically opposite to the first lubricant inlet perforation (133), comprises a preferably inclined interface region (134) wherein at least one lubricant outlet through-perforation (135) and at least one second lubricant inlet through-perforation (136) are arranged, in which both preferably have a central shaft preferably perpendicular to the external face of the interface region (134) and also fluidly interconnecting the external perimeter region (130) with the internal perimeter region (120). It should be noted that the first lubricant inlet through-perforation (133) may comprise, at its external end, a lubricant injector nozzle (I), wherein the lubricant outlet through-perforation (135) may in turn comprise a plug (B), whilst the second lubricant inlet through-perforation (136) may comprise a lubricant injector nozzle (I) or a plug (B) at its external end.

It should be noted that "lubricating elements" may be any type of lubricant used in electric motors, such as grease and/or oil.

The posterior region (140) is the region facing the rolling bearing and which abuts the rolling bearing (300), comprising a flat face into which the through-holes (111) open, a preferably elevated posterior annular section (141), and a preferably recessed posterior annular section (142).

The first and second annular seats (121, 123) each serve to house at least one sealing element (R) or gasket or other compatible annular sealing element, wherein the central flat annular surface (122) forms an intermediate lubrication chamber (124) arranged between and axially sealed by sealing elements (R), preferably but without limiting the invention by at least two sealing elements (R), wherein the intermediate lubrication chamber (124) is fluidly connected both with at least one first lubricant inlet through-perforation (133) and at least one lubricant outlet through-perforation (135). As such, the intermediate lubrication chamber (124) can be fed and re-supplied with lubricants through the lubricant injector nozzle (I) of the first lubricant inlet through-perforation (133), and the lubricant can be purged through the lubricant outlet through-perforation (135) after removing the plug (B).

It should be noted that the perforations (133, 135) are configured to be used for both lubricant inlet and outlet, provided that both perforations (133, 135) have opposite functions.

Therefore, the intermediate lubrication chamber (124) prevents the passage of polluting agents, e.g., water, dust, etc., into the rotating electric machine (200), whilst also allowing the lubricant contained within the intermediate lubrication chamber (124) to be renewed or replenished.

The posterior annular section (141), when placed against the rolling bearing (300), in combination with the posterior annular section (142) and sealed by at least one of the sealing elements (R), forms a rolling bearing lubrication chamber (143) facing to the rolling bearing (300) and fluidly connected to at least one second lubricant inlet through-perforation (136), but independent and without any fluidic connection with the intermediate lubrication chamber (124). As such, the rolling bearing lubrication chamber (143) can be fed and re-supplied with lubricants for the rolling bearing (300) through the second lubricant inlet through-perforation (136), wherein the lubricant, fed under pressure, enters into the rolling bearing lubrication chamber (143) and runs between the bearing races and elements of the rolling bearing (300) towards an internal lubrication chamber (201), remaining in direct fluidic contact with the rolling bearing (300) on both sides.

Thus, the present invention is capable of teaching a rolling bearing fastening ring (100) which, in addition to serving as a means of axially fixing of rolling bearing (300), is capable of being machined so as to be compatible with different seals to meet different degrees of protection, wherein the rolling bearing fastening ring (100) comprises an intermediate lubrication chamber (124), which prevents the passage of polluting agents into the rotating electric machine (200), and an lubricant injection nozzle (I) and plugs (B) which allows for independent lubricant re-supply to the rolling bearing (300) and to the intermediate lubrication chamber (124).

Furthermore, the present invention ensures a simple solution compared to the state of the art, capable of being easily removed for rolling bearing maintenance and other internal components, in addition to incorporating the solution to problems previously solved by two or more components in a single piece of a single body.

CONCLUSION

It will be easily understood by one skilled in the art that modifications may be made to the present invention without departing from the concepts set out in the description above. Such modifications should be considered as included within the scope of the present invention. Consequently, the particular embodiments previously described in detail are illustrative and exemplary only and are non-restrictive as to the scope of the present invention, which should be given the full extent of the appended claims and any and all equivalents thereof.

The invention claimed is:

1. A rolling bearing fastening ring for rotating electric machines, wherein the fastening ring comprises:

an internal perimeter region and an external perimeter region;

the internal perimeter region comprising a first annular seat, a central flat annular surface, and a second annular seat, the central flat annular surface being disposed between the first annular seat and the second annular seat;

a first sealing element (R) positioned in the first annular seat and a second sealing element positioned in the second annular seat;

wherein the first sealing element and the second sealing element, together with the central flat annular surface of the internal perimeter region, define an intermediate lubrication chamber when the fastening ring is positioned adjacent to and axially abutting a rolling bearing of the rotating electric machine;

wherein the second sealing element and the second annular seat of the internal perimeter region of the fastening ring define a rolling bearing lubrication chamber when the fastening ring is positioned adjacent to and axially abutting a rolling bearing of the rotating electric machine;

wherein the intermediate lubrication chamber is fluidly isolated from the rolling bearing lubrication chamber by the second sealing element;

wherein the fastening ring further comprises at least one first lubricant through-perforation, at least one second lubricant through-perforation and at least one third lubricant through-perforation, each through-perforations extending between the external perimeter region and the internal perimeter region of the fastening ring;

wherein the at least one first lubricant through-perforation and the at least one second lubricant through-perforation provide fluid communication between the external perimeter region of the fastening ring and the intermediate lubrication chamber, each of the first and the second lubricant through-perforations being configured to selectively function as a lubricant inlet or a lubricant outlet;

wherein the at least one third lubricant through-perforation provides fluid communication between the external perimeter region of the fastening ring and the rolling bearing lubrication chamber when the fastening ring is positioned adjacent to and axially abutting a rolling bearing of the rotating electric machine; and wherein the diameters of the first and second annular seats are equal to, or greater than, the diameter of the central flat surface disposed between them.

2. The rolling bearing fastening ring for rotating electric machines, according to claim 1, further comprising a plug and one or more lubricant injector nozzles mounted in respective lubricant through-perforations of the fastening ring, wherein the lubricant injector nozzles are configured to supply lubricant to the intermediate lubrication chamber and to the rolling bearing lubrication chamber.

3. The rolling bearing fastening ring for rotating electric machines, according to claim 1, wherein the fastening ring is formed as a single body piece exclusive of the sealing elements that cooperate with the fastening ring to define the lubrication chambers.

4. A rotating electric machine, comprising at least one rolling bearing housed in a cap of the rotating electric machine, and a rotor shaft, wherein the rotating electric machine comprises at least one rolling bearing fastening ring as defined in claim 1.

* * * * *